United States Patent
Langberg et al.

(10) Patent No.: US 7,400,710 B2
(45) Date of Patent: Jul. 15, 2008

(54) MIMO DYNAMIC PSD ALLOCATION FOR DSL NETWORKS

(75) Inventors: Ehud Langberg, Wayside, NJ (US);
William Scholtz, Red Bank, NJ (US);
Lujing Cai, Morganville, NJ (US);
Albert Rapaport, Morganville, NJ (US);
Shareq Rahman, Morganville, NJ (US);
Patrick Duvaut, Tinton Falls, NJ (US)

(73) Assignee: Conexant, Inc., Red Bank, NJ (US)

( * ) Notice: Subject to any disclaimer, the term of this patent is extended or adjusted under 35 U.S.C. 154(b) by 431 days.

(21) Appl. No.: 10/808,549

(22) Filed: Mar. 25, 2004

(65) Prior Publication Data
US 2005/0213714 A1 Sep. 29, 2005

(51) Int. Cl.
*H04M 1/24* (2006.01)
*H04M 3/08* (2006.01)
*H04M 3/22* (2006.01)

(52) U.S. Cl. ............... 379/1.03; 379/23; 379/24; 379/29.09; 370/252

(58) Field of Classification Search ........... 379/1.01, 379/1.03, 1.04, 22, 22.04, 22.07, 22.08, 23, 379/24, 28, 29.09, 414, 417; 370/241, 252, 370/253
See application file for complete search history.

(56) References Cited

U.S. PATENT DOCUMENTS

| | | | | |
|---|---|---|---|---|
| 6,055,297 | A * | 4/2000 | Terry | 379/1.01 |
| 6,061,427 | A * | 5/2000 | Ryoo | 379/22.04 |
| 6,226,356 | B1 * | 5/2001 | Brown | 379/24 |
| 6,532,277 | B2 * | 3/2003 | Ulanskas et al. | 379/27.01 |
| 6,845,149 | B2 * | 1/2005 | Liu | 379/24 |
| 6,870,901 | B1 * | 3/2005 | Gudmundsson et al. | 379/22 |
| 7,116,725 | B2 * | 10/2006 | Ketchum et al. | 375/295 |
| 2003/0112967 | A1 * | 6/2003 | Hausman et al. | 379/417 |
| 2003/0133409 | A1 * | 7/2003 | Corazza | 370/230 |
| 2005/0213714 | A1 * | 9/2005 | Langberg et al. | 379/32.01 |
| 2006/0193294 | A1 * | 8/2006 | Jorswieck et al. | 370/334 |

* cited by examiner

*Primary Examiner*—Quoc D Tran
(74) *Attorney, Agent, or Firm*—Thomas, Kayden, Horstemeyer & Risley LLP

(57) ABSTRACT

A system and method for multiple inputs, multiple outputs (MIMO) PSD allocation in a DSL system is disclosed. In some embodiments, the method may comprise monitoring system performance by performing a multi-ended line test (MELT), processing the MELT and allocating PSD based on at least one of system coupling power and system traffic.

22 Claims, 2 Drawing Sheets

MIMO DYNAMIC PSD ALLOCATION FOR DSL NETWORKS

BACKGROUND OF THE INVENTION

Systems and methods for dynamically allocating power and power spectral densities (PSD) at a remote device located at a digital subscriber line access multiplexer (DSLAM) for each digital subscriber line (DSL) connected service are disclosed.

In typical DSL systems, power and PSD are allocated on a pair-to-pair basis. Thus, power and PSD are typically allocated in a single input, single output (SISO) fashion. Accordingly, in SISO systems it is not possible to reallocate power or PSD to compensate for increased (or decreased) demand on one or more of the systems. This can lead to system inefficiencies. Other drawbacks also exist.

SUMMARY OF THE INVENTION

Accordingly, there is provided a system and method for multiple inputs, multiple outputs (MIMO) PSD allocation in a DSL system. In some embodiments, the method may comprise monitoring system performance by performing a multi-ended line test (MELT), processing the MELT and allocating PSD based on at least one of system coupling power and system traffic.

In some embodiments, the method of performing a MELT may further comprise dynamically determining the near end cross talk (NEXT)/ECHO couplings at a customer premises (CP) location and a central office (CO) location. The method of performing a MELT may also comprise dynamically determining the far end cross talk (FEXT) couplings at a CP location and a CO location.

Embodiments of the invention may process the MELT by a disruptive method. Other embodiments may process the MELT by a non-disruptive method. Non-disruptive methods may comprise passive or active methods. Other methods are also possible.

In some embodiments, the allocation of PSD based upon system coupling power may comprise implementing a full mask control scheme. Other embodiments may allocate PSD by implementing a selective bit control scheme or by implementing a power swap scheme. Other techniques are also possible.

Embodiments of the invention also provide a system for dynamically monitoring and allocating upstream and downstream power spectral density (PSD) of a transceiver set. In some embodiments the system may comprise a monitor for performing MELTs, a controller, responsive to the monitor, for dynamically allocating upstream and downstream PSD and a table of upstream PSD and downstream PSD for each time (t) and each line. In accordance with other aspects of the invention, the monitor and the controller may be receptive to a priori information from other system levels.

The present invention provides techniques that dynamically allocate power and spectral densities to a downstream (DS) network in a centralized manner. A remote device located at a DSL access multiplexer (DSLAM) regularly (i.e., at time slot t) senses the budget demand of each DSL connected service. To illustrate, if one system is idle there typically is no need to transmit any power until the demand resumes. This available power may be used to provide improved service to remote customer premises (CPs). If one CP equipment (CPE) is near the DSLAM and one is remote, delivering a minimum rate to each does not require the same power. The centralized system then may allocate power/power spectral density (PSD) to each DSL system in accordance to its demands or needs in such a way that the total power delivered to the series of connected DSL systems is substantially fixed to a certain fixed value P. The dynamically centralized allocation procedure also may handle the spectral compatibility among the different DSL systems. The centralized device ensures spectral compatibility. Another exemplary technique of the present invention is to allocate power/PSD in a multiple input, multiple output (MIMO) manner instead of a single input, single output (SISO) manner. This approach makes better use of the fixed global power available for the whole DSLAM.

Other systems and methods are also possible.

DETAILED DESCRIPTION OF THE DRAWING FIGURES

Exemplary systems and techniques of various embodiments of the invention are now described in detail. The following description is intended to convey a thorough understanding of the invention by providing a number of specific embodiments and details involving DSL-based systems. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
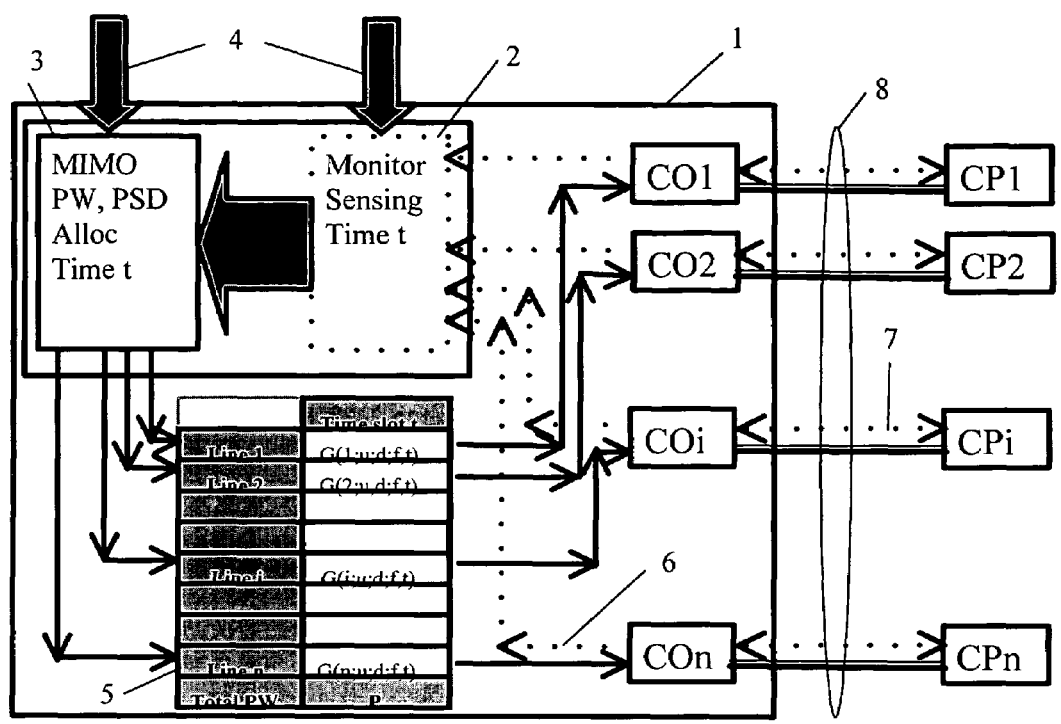
FIG. 1 is a schematic illustration of the dynamic power allocation system according to some embodiments of the invention.

FIG. 1 is a schematic diagram of a MIMO dynamic PSD allocation system according to some embodiments of the invention. As shown in FIG. 1, the system may comprise a centralized part located at the CO.

Embodiments of the system may also comprise a monitor 2 for monitoring the system. For example, monitor 2 may perform a MELT or other line test. The monitoring may occur at any suitable time. For example, monitor 2 may sense at any number of predetermined times (t).

Monitor 2 may communicate with a controller 3. In some embodiments, controller 3 may dynamically allocate, at every time (t), the upstream and downstream PSD.

In some embodiments, monitor 2 and controller 3 may receive a priori information 4 from other parts of the system. For example, a priori information 4 may comprise Local network information, sources of cross talk, bundle distribution, system traffic information, or other sources of information. In some embodiments, this a priori information 4 is dynamically updated.

In some embodiments, the system may comprise a table 5 of upstream and downstream PSDs for each time (t). Table 5 may comprise any suitable table, such as a software table, firm ware table, or other suitable format. As shown in FIG. 1, table 5 may contain a table of lines (e.g., line 1, . . . , line n) and corresponding time slot (t) PSD upstream and downstream values (e.g., G(1;u;d;f;t), . . . , G(n;u;d;f;t)).

As indicated in FIG. 1 information to monitor 2 may come from various parts of the system. For example, as indicated by the broken line information 6 may come from the CO or CP.

In addition, information and parameters may be exchanged between the CO and CP as indicated at 7. The bundle 8 indicates the grouping of monitored lines (e.g., lines 1-n).

In some embodiments, monitor 2 may perform MELT. The aim of the monitoring piece is to dynamically perform MELT. In some embodiments, the MELT procedure should dynamically provide the following set of parameters.

The first parameter may be NEXT/ECHO couplings at the CPs: $H_{i \to j}^{CP}(f,t)$, $1 \leq i, j \leq n$ at each frequency f and at each time instant t. All these parameters are collected in a Matrix $H^{CP}(f,t)$ at each frequency f and at each time instant t.

Another parameter may be NEXT/ECHO Couplings at the COs: $H_{i \to j}^{CO}(f,t)$, $1 \leq i, j \leq n$ at each frequency f and at each time instant t. All these parameters are collected in a Matrix $H^{CO}(f,t)$ at each frequency f and at each time instant t.

Another parameter may be FEXT Couplings from the COs to the CPs: $H_{i \to j}^{CO \to CP}(f,t)$, $1 \leq i, j \leq n$ at each frequency f and at each time instant t. All these parameters are collected in a Matrix $H^{CO \to CP}(f,t)$ at each frequency f and at each time instant t.

Still another parameter may be FEXT Couplings from the CPs to the COs: $H_{i \to j}^{CP \to CO}(f,t)$, $1 \leq i, j \leq n$ at each frequency f and at each time instant t. All these parameters are collected in a Matrix $H^{CP \to CO}(f,t)$ at each frequency f and at each time instant t.

In some embodiments, symmetries may simplify the structure of each matrices and the relationship between matrices. In what follows $H_{prior}^{x}(f,t)$ will denote the a priori information coming from another level, identified as 4 in FIG. 1, irrespective of what x represents.

In different embodiments there may exist different methods to process MELT. For example, there may exist disruptive and non disruptive methods.

For some embodiments, disruptive methods may require to re-start at least one of the monitored modems. These methods can be processed at the very first installation of the system based on a vectorial start up. Similar to round robin tests, each modem will transmit a particular sequence and all the others will listen on both sides to have access to the matrices described above. Disruptive methods are active, in the sense they make each modem actively transmit a signal to sense the whole system.

For some embodiments, non-disruptive methods may not require to re-start any of the monitored modems. For some embodiments, two families of non-disruptive methods, active and passive, may exist.

For some embodiments, non-disruptive, active methods can, for example, increase the gi's of one particular system and check which other system will fall in SRA/Bit swap mode to update its bit loading. Similarly, for some embodiments, non-disruptive, passive methods do not generate extra-signals/power and may use the cross correlation between the residual error at each frequency and the NEXT/FEXT source.

In the following, the operation of some embodiments of the Control/Information exchange (e.g., items 3, 5 and 7 in FIG. 1) is explained.

In some embodiments, controller 3 may function based on coupling/power. For example, controller 3 may implement a full mask control scheme. In some embodiments, a full mask control scheme is a scheme in which the CO communicates to the CP the PSD mask to use to recompute on-the-fly a new bit-loading and using the SRA procedure to establish the new configuration in a non-disruptive way (as described in BIS).

In some embodiments, selective bit control may be implemented. Selective bit control may comprise a similar scheme as the full mask control described above but the CO communicates and/or a region in which the CP will re-compute the bit loading without changing the power allocation but reduced the bit/bin. This is an equivalent to having a margin per bin.

In some embodiments, another control scheme based on coupling/power is a power swap scheme. A power swap scheme may comprise a scheme in which the CO using the above schemes (e.g., full mask, selective bit, etc.) to re-distribute more power or PSD to some port or a scheme in which the power does not change in all ports but the information that each port carry will change on the fly. There are few scenarios to support one in which a power in a particular region is moved to anther port or a scheme in which an additional power is provided to anther port and only the margin in other ports which are influenced will be reduced.

In some embodiments, controller 3 may implement a control scheme based on traffic. For example, a traffic based power swap scheme may be implemented. A traffic based power swap scheme may comprise a scheme in which the CO monitors the data traffic, payload activity, on all the ports and based on the activities it re-allocates the power/margin to the ports which requires the additional payload.

Another traffic based control scheme may comprise an anticipated power swap scheme. In some embodiments, the anticipated power swap scheme may operate similar to the traffic based power swap scheme with a difference being that the anticipated power swap scheme may include short term as well as long term predictions.

Yet another traffic based control scheme may be selective power swap. This scheme may operate similar to the above schemes, but may additionally be based on the service the customer is subscribed to.

Still another traffic based control scheme may comprise a MIMO channel driven power swap scheme. This too may operate similar to the above, except it may also include consideration of the crosstalk table from above.

Figure 2:
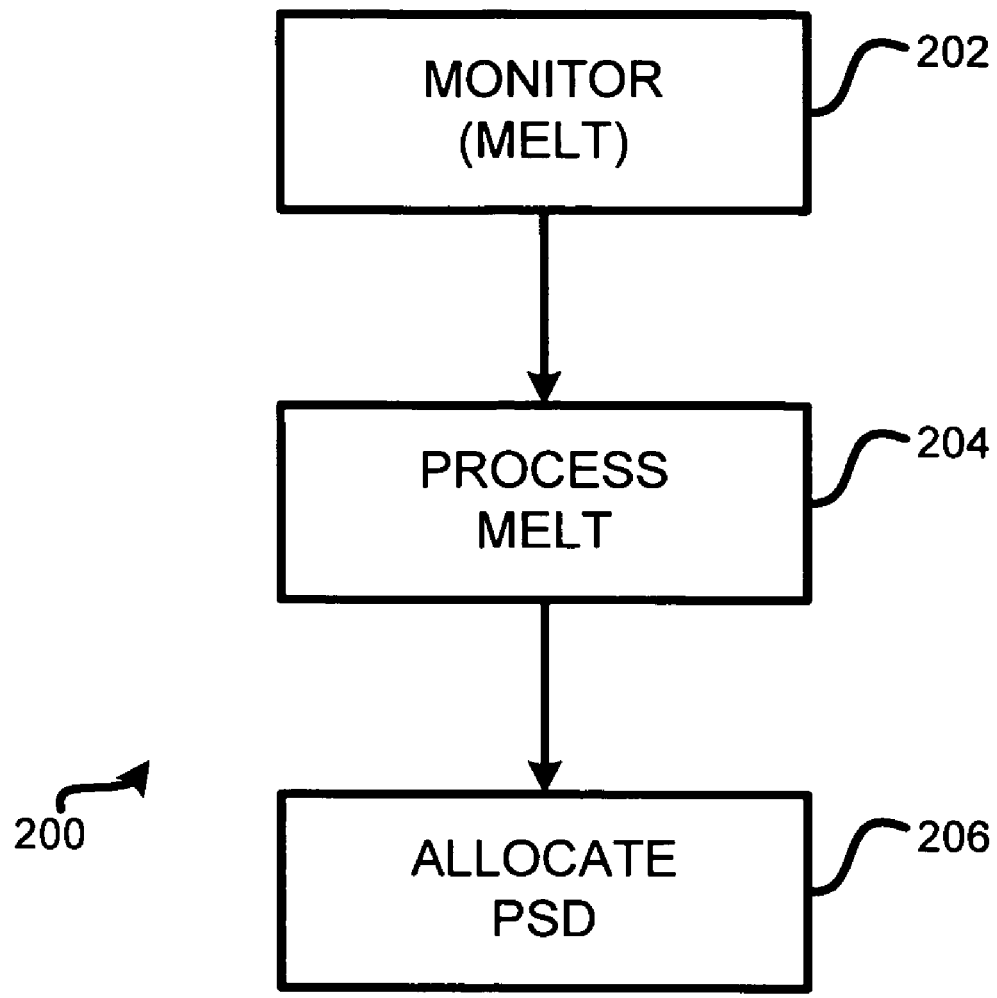
FIG. 2 is a schematic flow chart illustrating a method for dynamic power allocation in accordance with embodiments of the invention.

FIG. 2 is a schematic flow chart illustrating a method for dynamic power allocation in accordance with embodiments of the invention. As indicated in FIG. 2, the process may begin with monitoring 202. Monitoring may comprise a MELT or other monitoring scheme. At 204, the MELT or other monitoring scheme is processed as described above. For example, using a disruptive or non-disruptive method. Finally, at 206 PSD may be allocated according to a suitable scheme as described above.

While the invention has been described in conjunction with the preferred embodiments, it should be understood that modifications will become apparent to those of ordinary skill in the art and that such modifications are intended to be included within the scope of the invention and the following claims.

What is claimed is:

1. A method for multiple inputs, multiple outputs (MIMO) power spectral density (PSD) allocation in a digital subscriber line (DSL) system, the method comprising:
   monitoring system performance by performing a multi-ended line test (MELT);
   processing the MELT; and
   allocating PSD based on at least one of the following: system coupling power and system traffic, the allocating PSD based on system coupling power comprising a full mask control scheme, the full mask scheme configured for a central office to communicate the allocated PSD to a customer premises to re-compute a bit-loading using a seamless rate adaptation (SRA) procedure.

2. The method of claim 1 wherein performing a MELT further comprises: dynamically determining the near end cross talk (NEXT)/ECHO couplings at a customer premises (CP) location.

3. The method of claim 1 wherein performing a MELT further comprises: dynamically determining the near end cross talk (NEXT)/ECHO couplings at a central office (CO) location.

4. The method of claim 1 wherein performing a MELT further comprises: dynamically determining the far end cross talk (FEXT) couplings at a customer premises (CP) location.

5. The method of claim 1 wherein performing a MELT further comprises: dynamically determining the far end cross talk (FEXT) couplings at a central office (CO) location.

6. The method of claim 1 wherein processing the MELT further comprises processing the MELT by a disruptive method.

7. The method of claim 1 wherein processing the MELT further comprises processing the MELT by a non-disruptive method.

8. The method of claim 7 wherein the non-disruptive method further comprises an active method.

9. The method of claim 7 wherein the non-disruptive method further comprises a passive method.

10. A system for dynamically monitoring and allocating upstream and downstream power spectral density (PSD) of a transceiver set, the system comprising:
a monitor for performing multi-ended line tests (MELT);
a controller, responsive to the monitor, for performing multiple inputs, multiple outputs (MIMO) dynamic PSD allocation of upstream and downstream PSD, the controller further configured to implement a full mask scheme for a central office to communicate the allocated PSD to a customer premises to re-compute a bit-loading using a seamless rate adaptation (SRA) procedure; and
a table of upstream PSD and downstream PSD for each time (t) and each line.

11. The system of claim 10, wherein the monitor is receptive to a priori information from other system levels.

12. The system of claim 10, wherein the controller is receptive to a priori information from other system levels.

13. A system for multiple inputs, multiple outputs (MIMO) dynamic monitoring and allocation of upstream and downstream power spectral density (PSD) of a transceiver set, the system comprising:
a monitor for performing multi-ended line tests (MELT) on components within the DSL system;
a controller, for performing MIMO dynamic allocation of upstream and downstream PSD for the components within the DSL system, wherein the controller is responsive to at least one of the monitor and a priori knowledge received from components within the DSL system, the controller further configured to implement a full mask scheme for a central office to communicate the allocated PSD to a customer premises to re-compute a bit-loading using a seamless rate adaptation (SRA) procedure; and
a table of upstream PSD and downstream PSD for each time (t) and each line.

14. The system of claim 13, wherein the monitor is receptive to a priori information from components within the DSL system.

15. The system of claim 13, wherein the multi-ended line tests include at least one of the following:
dynamic determination of near end cross talk (NEXT)/ECHO couplings at a customer premises (CP) location;
dynamic determination of far end cross talk (FEXT) couplings at a central office (CO) location;
dynamic determination of far end cross talk (FEXT) couplings at the CP location; and
dynamic determination of far end cross talk (FEXT) couplings at the CO location.

16. The system of claim 13 wherein the controller is further configured to perform MIMO dynamic allocation of upstream and downstream PSD by a disruptive method.

17. The system of claim 13 wherein the controller is further configured to perform MIMO dynamic allocation of upstream and downstream PSD by a non-disruptive method comprised of an active method and a passive method.

18. The method of claim 1 wherein the allocation of PSD based upon system traffic further comprises implementing a traffic based power swap scheme.

19. The method of claim 18 wherein the traffic based power swap scheme includes at least one of the following: an anticipated power swap scheme and a selective power swap scheme.

20. The method of claim 18 wherein the allocating PSD based on system coupling power includes at least one of the following: a full mask control scheme, a selective bit control, and a power swap scheme.

21. A system for multiple inputs, multiple outputs (MIMO) power spectral density (PSD) allocation in a digital subscriber line (DSL) system, the method comprising:
means for monitoring system performance by performing a multi-ended line test (MELT);
means for processing the MELT; and
means for allocating PSD based on at least one of the following: system coupling power and system traffic, the allocating PSD based on system coupling power comprising a full mask control scheme, the full mask scheme configured for a central office to communicate the allocated PSD to a customer premises to re-compute a bit-loading using a seamless rate adaptation (SRA) procedure.

22. The method of claim 21 wherein means for performing a MELT further comprises: means for dynamically determining the near end cross talk (NEXT)/ECHO couplings at a customer premises (CP) location.

* * * * *